Patented Dec. 6, 1949

2,490,462

UNITED STATES PATENT OFFICE 2,490,462

HALOGENATION PRODUCTS OF ALDEHYDES OF MONO-HETEROATOMIC FIVE MEMBERED RINGS AND METHODS OF MAKING SAME

Emil E. Novotny, Prospectville, and George Karl Vogelsang, La Montt, Pa., assignors, by mesne assignments, to The Borden Company, New York, N. Y., a corporation of New Jersey No Drawing. Application November 4, 1942, Serial No. 464,524

19 Claims. (Cl. 260—345)

This invention concerns itself broadly with the saturated halogenation products of the aldehydes of mono-heteroatomic five membered rings, as well as with methods for preparing said products.

In a more specific aspect, the invention relates to the saturated halogenation products of the aldehydes of furan and its homologues, and to methods for preparing said products. The aldehydes of the analogues, thiophen and pyrolle, may be used in lieu of the aldehydes of furan and its homologues.

In a preferred aspect, the invention relates to the saturated chlorination products of the aldehydes of furan and its homologues, and to methods for preparing said products.

By way of introduction, it may be stated that prior to this invention compounds such as the aldehydes of furan and its homologues were considered as being too reactive and unstable in the presence of acidic and oxidizing agents to permit of their controlled halogenation. It was therefore not to be anticipated that it was possible to procure in appreciable yield and in isolatable form, the sought after halogenation products. Experimentation discloses that when a halogen is brought into contact with such an aldehyde, it is quickly absorbed with a considerable generation of heat. However, it has not been found possible to isolate definite halogenation products from such mixtures comprising these aldehydes and small quantities of halogens. Indeed, such mixtures are unstable and if permitted to stand for a sufficient period of time, even at room temperature, undergo spontaneous reaction with the formation of much heat and a copious evolution of acrid irritating fumes, the residuum forming a resinous black coke-like mass. Attempts at distilling off the unreacted furfural immediately after the absorption of halogen invariably are unsuccessful, even with the employment of low temperatures concomitant with high vacuum, due to spontaneous decomposition.

On the other hand, when one attempts to introduce a quantity of halogen sufficient to theoretically saturate the aldehyde, it is again found that it is not possible to procure the desired halogenation products. When, for example, chlorine is passed into furfural, even at relatively low temperatures, it is found that before the full quantity of chlorine can be introduced, a greater or lesser quantity of resinous coke-like material is engendered, and eventually the mass undergoes spontaneous decomposition.

It is noted that, irrespective of the quantity of halogen that one may attempt to introduce into these aldehydes, it is not possible to procure the desired saturated halogenation products. In this connection, it is interesting to note that the resinous coke-like residuum that results from the spontaneous reaction is very similar in appearance to that which is gotten when strong mineral acids are added to such aldehydes. Our studies have indicated that in the instance of the direct halogenation of the aldehyde, the spontaneous decomposition may result from one or more of the following causes:

I. The presence of halide formed via side reactions.

II. Reaction between unhalogenated aldehyde and halogenated aldehyde.

III. Reaction between fully halogenated aldehyde and less fully halogenated aldehyde.

The term "fully halogenated" as used throughout the specification has reference to the fully saturated halogenation products and does not refer to halogenations involving substitution reactions with the exception of incidentally possible substitution of the imine hydrogen in the instance of the pyrrole aldehydes.

A study of the causes for the spontaneous decomposition already alluded to has led the present inventors to the discovery that the aldehydes of furan and its homologues or their equivalents may be successfully halogenated, provided that due consideration is given to the following essential controlling factors:

I. That appropriate quantities of a suitable diluent be employed.

II. The halogenation must be permitted to go to completion within the shortest time possible, i. e., the halogenation must not stop appreciably short of the point of full saturation, otherwise spontaneous decomposition sets in.

III. The temperature should not be permitted to exceed predetermined limits, the exact maximum permissible temperature depending upon the specific aldehyde being halogenated and the type and quantity of diluent employed.

Conversely in the absence of a diluent, or if the halogenation is stopped appreciably short of the point of full saturation, or if the temperatures are too high, then the resultant mixture is unstable and will undergo spontaneous decomposition.

By taking due cognizance of the above essential controlling factors, it is possible to procure stable halogenation products which may be isolated in any one of several ways. In the interests of uniformity and purity, we recommend that the aldehyde be substantially dry and relatively pure.

The present inventors have made the further wholly unexpected discovery that the halogenation products of these aldehydes are not the expected tetrahalides of the monomeric aldehyde in question, but are substances generally possessed of twice the expected molecular weight. These unexpected halogenation products are possessed of a complex structure and appear to contain two original aldehyde molecules and eight atoms of halide per molecule. Upon appropriate treatment or long standing there is evidence that the molecular weights undergo a further increase due to some reaction of condensation and/or polymerization.

The further discovery has been made that the saturated halogenation products of these aldehydes are possessed of many unique and unexpected properties, among them an extraordinary chemical reactivity such that under appropriate conditions they may be made to directly or indirectly react with virtually all known organic compounds.

A large number of materials are suitable as diluents. The diluents may conveniently be divided into two classes: (1) those that are inert to the halogen and (2) those that may potentially react with the halogen. It should be noted that many diluents which, while potentially capable of reacting with halogens, may nevertheless under the actual conditions of halogenation encountered in halogenating the aldehydes, be substantially unaffected. The inertness of the diluent is in a large measure predicated upon the reactivity of the halogen in question. Thus fluorine, the most reactive of the halogens, is known to react with most organic compounds under appropriate conditions. Chlorine, which is less reactive than fluorine, also can react with a large number of organic compounds, but none the less under the conditions of chlorination encountered in the present instance, it is found that many diluents are available which react to but a negligible degree. Bromine and iodine, the least reactable of the halogens, permit of an even greater leeway in the choice of the diluent. In conclusion, it is to be noted that while some usable diluents may be entirely inert to the halogens, others may be potentially capable of reacting with halogens under appropriate conditions, yet under the conditions of halogenation, as per the present invention, they may behave as substantially inert diluents. Then again, the mere fact that the diluent may, to a greater or lesser extent, react with the halogenating medium does not necessarily preclude the use of the same as a diluent.

The tetrahalogen substitution products of monofluor-trichloromethane, difluor-dichloromethane and trifluor-monochlormethane are illustrative of diluents that are substantially inert to iodine, bromine and chlorine. Halogenated aliphatics such as methyl chloride, methyl fluoride, ethyl chloride, ethyl fluoride, propyl chloride, propyl fluoride, ethylene dichloride, ethylene difluoride, trichlorethylene, trifluorethylene, tetrachlorethylene, tetrachlorethane, chloroform and floroform are substances which, while potentially capable of reacting with chlorine and fluorine under appropriate conditions, may be utilized as diluents. In the instance of the most common and practical halogenating agent, chlorine, many hydrocarbons are quite satisfactory as diluents. Iodine, which is less reactive than chlorine or bromine, permits of a greater leeway as regards the selection of useful diluents.

It is essential that an adequate quantity of diluent be employed. Experiments have shown that at least one molecule, and preferably two or more molecules of diluent should be employed per molecule of aldehyde. Thus, highly satisfactory results are procured when one utilizes two molecules of carbon tetrachloride per molecule of aldehyde.

In order to obtain an ultimate product which is as free as possible from extraneous substances such as diluents, by-products and decomposition products, the diluent should be one, which does not undergo appreciable reaction with the halogenating medium, and which is readily volatile and yet not so volatile as to lead to equipment complications or difficulties in its recovery.

Carbon tetrachloride appears to be the best all-around diluent. Carbon tetrachloride is not only inert towards bromine, iodine and chlorine, but its boiling point is sufficiently high to obviate the necessity of operating under pressure, and on the other hand, is sufficiently low to render its removal from the halogenated aldehyde by means of evaporation or distillation a relatively simple matter.

As has been indicated, care must be exercised not to exceed predetermined temperatures. The exact maximum permissible temperature depends upon the specific aldehyde being halogenated, the halogen in question and the type and quantity of the diluent. Generally speaking, the halogenation should be conducted at temperatures below 100° C. although on occasion we have found it possible to carry out the halogenation at temperatures appreciably above 100° C. Further, in the interests of safety, we prefer to carry out the halogenation at temperatures below 40° C. (100° F.) There does not appear to be any definite temperature below which the halogenation cannot be carried out, though it is advantageous to maintain temperatures such that the system remains in a fluid condition.

The halogenation may be carried out at atmospheric pressure, above or below atmospheric pressure. When utilizing the preferred diluent, carbon tetrachloride and the most important halogenating medium, chlorine, we prefer to conduct the halogenation at atmospheric pressure for in this instance there appears to be no advantage in operating at pressures other than atmospheric. From the standpoint of equipment, care should be taken that the same is processed out of materials that are adequately resistant to the highly corrosive halogens. In instances where chlorine, bromine or iodine are utilized as the halogenating mediums, we recommend the use of glass or glass-lined equipment.

The halogenation may be advantageously carried out in substantially the following manner:

One mole of aldehyde is dissolved in two or so moles of organic diluent, preferably an inert diluent such as carbon tetrachloride. The halogen is then gradually introduced until the quantity introduced is substantially equal to or somewhat in excess of that which is required to theoretically saturate the aldehyde. The halogenation should be carried out in the shortest possible time. Generally speaking the time required is dependent upon the facilities that have been provided to carry off the heat of reaction so that the temperature at no time exceeds the critical limits, and preferably is kept below 40° C. Upon the completion of the reaction, the mixture may be permitted to warm up to room temperature or it may be permitted to rise to higher temperatures. The mixture may be permitted to stand for a considerable length of time without danger of its undergoing spontaneous decomposition. The mixture may be subjected to a processing operation calculated to remove the diluent, e. g., via vacuum distillation. At the close of such operations of distillation, the vacuum may be increased to advantage and temperatures as high as 110 to 150° C. may be employed to expedite and assure the thorough removal of the volatile diluent, e. g., carbon tetrachloride. For some applications it may be advantageous to leave the saturated halogenation product in the diluent and to use the solution per se.

If a reactive diluent is employed the halogenation proceeds in a normal manner, but a portion of the diluent may react with the halogens so that the solution contains in addition to the saturated halogenated aldehyde and diluent some halogenated diluent. Depending upon the vapor tension of the products in question, more or less of the halogenated diluent may be driven off along with the unreacted diluent in subsequent distillation steps, but unless a relatively high temperature is employed, there is a tendency for some of the halogenated diluent to remain behind with the halogenated aldehyde. If the temperature is raised to a point calculated to assure the removal of the halogenated diluent, there is danger of some of the halogenated aldehyde decomposing or reacting with the diluent or halogenated diluent.

It is for these reasons that we prefer to utilize an inert diluent such as carbon tetrachloride, which can readily be removed from the halogenated aldehyde.

The halogenation should be conducted under conditions calculated to prevent or minimize localized reaction. It is recommended that adequate stirring or agitation be employed so as to assure a rapid dispersion of the halogenating agent. A wide variety of types of halogenating equipment may be utilized. Many of the processes in customary use for operations of halogenation are preeminently suited for use in carrying out the present invention.

As we have already indicated, the halogenation should be carried out in the shortest possible time. Generally speaking, this time is dependent upon the facilities which have been provided to carry off the heat of reaction so that the temperature is kept within the desired range. The reason why the halogenation should be carried out in a short time and should not be too drawn out becomes self-evident from the following consideration, viz., the halogenated aldehydes are highly reactive and may react with the un-halogenated aldehyde. Let us suppose for purposes of exemplification that one-half of the aldehyde has been more or less fully halogenated—this halogenated aldehyde is potentially capable of reacting with the un-halogenated aldehyde and if such reaction occurs, it would give rise to the already described more or less violent spontaneous decomposition. If, therefore, the halogenation be too drawn out, then there is an increased possibility of the halogenated aldehyde reacting with the un-halogenated aldehyde, and it is for the purpose of preventing such spontaneous decomposition that we find it necessary to carry out the halogenation rapidly. The use of an appropriate diluent and a low temperature, while not appreciably exerting any adverse effect upon the halogenation proper, does help in retarding or preventing the alluded to spontaneous decomposition from setting in. With the proper control of temperature and the use of an appropriate quantity of a suitable diluent, successful halogenations may be carried out in between four and ten hours. This time range may be shortened or lengthened under appropriate conditions.

The manner of introducing the halogen deserves some consideration. Where iodine is used as the halogenating medium, we prefer first to dissolve the same in an appropriate solvent and then to run the iodine solution into the solution of aldehyde. In the instance of bromine, the same may be directly run or dropped into the solution of aldehyde provided that a very fine stream is used so as to yield extremely minute droplets of liquid bromine, concomitant with a high speed agitation to assure a rapid and thorough dispersal. Perhaps a better practice is to dissolve the bromine in an appropriate solvent and then to run this halogen solution into the solution of aldehyde. Where chlorine is used as the halogenating agent, we prefer to use the same in gaseous form and to pass it directly into the solution of aldehyde. Work with gaseous fluorine is extremely difficult and hazardous and we cannot be certain of the exact nature of the end product owing to the great reactivity of this halogen—it is believed, however, that the reaction products in the instance of fluorine are quite similar to those procured when the other halogens are used, basing this conclusion upon the known kinship between chlorine and fluorine.

In the halogenation of the aldehydes of the monoheteroatomic five membered rings, e. g., the aldehydes of the furans and their homologues or analogues, it is permissible to employ mixtures of aldehydes. Thus, one may halogenate an equimolecular mixture of furfural and methyl furfural just as readily as one can halogenate straight furfural or straight methyl furfural.

Just as it is possible to employ a mixture of aldehydes in lieu of a single aldehyde, it is likewise perfectly feasible to employ a mixture of halogens, for example, one may utilize a mixture of chlorine and bromine in lieu of solely using either chlorine or bromine.

It is to be observed that the present invention refers specifically to the aldehydes of the mono-hetero-atomic five membered rings. There are indications, however, that in lieu of aldehydes, it is possible to utilize certain other compounds either alone or in admixture with the aldehyde. On the other hand, it is interesting to note that neither the parent heterocyclic hydrocarbons nor their carboxylic acids, whose halogenation products are known, can be used in the present invention. Indeed the halogenation products of these parent hydrocarbons or their carboxylic acids are monomeric in character and, as such, contain but a single hetero-cyclic nuclei whereas, as will be shown later, the products of the present invention are of a more complex nature. It is believed that the complexity of the products of the present invention, i. e. the fact that they contain at least two original heterocyclic molecules in their structure, is in some way or other associated with the fact that the original compounds are of an aldehyde character. The present inventors have found that some derivatives of the aldehydes, e. g., furfur-acetone and its homologues and analogues, upon chlorination, yield interesting products which, however, appear to be distinct from the products of the present invention. There are, however, indications that the halogenation of some of the derivatives of the mono-hetero-atomic five membered rings other than the aldehydes when used alone or in conjunction with the aldehydes yield complex products which, to a greater or lesser extent, partake of the properties with which the halogenation products herein specifically described are endowed.

ILLUSTRATIVE EXAMPLES

Example I

Fifteen parts of dry, pure furfural are dissolved in fifty parts of carbon tetrachloride in a glass-lined chlorinator provided with a suitable stirrer and cooling facilities. Chlorine is passed into the mixture at as rapid a rate as is consistent with the cooling facilities and the attainment of a good absorption efficiency. The solution should be permitted to absorb approximately 22.2 parts of chlorine. The temperature is kept from rising above 100° F. and is preferably kept below 80° F. The resultant solution of fully chlorinated furfural is very stable and such solution, on standing for a period of a year, shows no appreciable change. Such mixtures may also be refluxed for considerable periods of time without undergoing any discernible change. The mixture may be subjected to vacuum distillation so as to drive off the diluent. Towards the end of this operation the vacuum may be increased to advantage and the temperature may be raised to in the neighborhood of 125° C. to assure a thorough removal of the solvent. In the process of vacuum distillation, a slight amount of chlorinated furfural may distill over along with the carbon tetrachloride. At the same time there is a tendency, though slight, for the chlorinated furfural to cleave off chlorine products, e. g., chlorine, hydrogen chloride, etc.

Example II

The furfural of Example I is replaced by a molecularly equivalent quantity of methyl furfural. The halogenation is carried out in a manner similar to that indicated for Example I.

Example III

Similar to Examples I and II, except that the gaseous chlorine is replaced by a solution containing a molecularly equivalent quantity of iodine in an appropriate solvent.

Example IV

Similar to Examples I and II, except that the gaseous chlorine is replaced by a solution containing a molecularly equivalent quantity of bromine.

Example V

Similar to Examples I and II, except that the gaseous chlorine is replaced by a molecularly equivalent quantity of fluorine which can be diluted with an inert gas. The fluorine is conveniently produced via the electrolysis of pure hydrogen fluoride in the presence of an alkali metal salt to enhance the electrical conductivity of the same. It is necessary to use structural materials which are substantially inert to fluorine. As is well known, the handling of gaseous fluorine is exceedingly difficult owing to the tendency of this halide to react with most structural materials, solvents, etc. It appears that carbon tetrafluoride under a pressure sufficient to maintain the same in a fluid state is a suitable solvent. Trifluoro-chloromethane may also be considered quite satisfactory. Although gaseous fluorine is capable of directly combining with finely divided carbon, nevertheless it appears that equipment fabricated out of carbon when utilized in the cold is a fairly satisfactory construction material. Platinum and platinum-iridium alloys are useful. Fluorspar is also useful as a structural material. When utilizing fluorine, it is recommended that greater than usual dilutions of the aldehyde be employed and the temperature be likewise kept lower than usual, in order to minimize the tendency for the formation of substitution products.

Example VI

Similar to Examples I to V except that in lieu of furfural or methyl furfural, a molecularly equivalent quantity of an aldehyde of thiophen is used. b-Thiophenaldehyde, for example, may be procured from the distillation of thienylglyoxylic acid.

Example VII

Similar to Examples I to V except that in lieu of furfural or methyl furfural a molecularly equivalent quantity of an aldehyde of pyrrole is used. a-Pyrrolealdehyde, for example, may be obtained via the action of chloroform and aqueous potash upon pyrrole.

The yield of product appears to depend upon the degree of vacuum and the temperature prevailing during the distillation step. Theoretically the fifteen parts of furfural referred to in Example No. 1 should yield 37.2 parts of saturated chlorinated furfural. In actual practice the yield may vary between 35 and 38 parts of product. For practical purposes, it is preferable to operate the process so as to obtain a yield somewhat below the theoretical figure, e. g., 36.2 parts, as tests have shown that a product processed to the theoretical yield is apt to be contaminated with small quantities of carbon tetrachloride.

In the ensuing discussions, we shall confine our remarks to the fully saturated chlorination product of furfural inasmuch as this is the product that is of the greatest interest, both from the standpoint of production and general reactivity. It is also to be noted that this product is produced out of the most readily available of the aldehydes of the furan series or its homologues and analogues, and the most inexpensive and readily procurable halogenating agent, namely chlorine. The saturated chlorination product of furfural is practically producible in unlimited quantities.

The color of the saturated chlorination product of furfural is found to depend upon a number of factors including the purity and color of the starting furfural, the type of equipment used, and the time-temperature schedule. Dry, freshly prepared, pure furfural yields the lightest color, viz., a light straw color, otherwise it may possess a honey-like color, and upon standing the material gradually acquires a deeper amber color with a greenish tinge.

At temperatures above 50° C. the fully saturated chlorination product of furfural, hereinafter for convenience referred to as "chlorinated furfural," is a viscous liquid, comparable to honey in consistency. At 25° C. it has a heavy sirupy-like consistency, which may best be described as comparable to that of roofer's pitch. If the product is cooled to 5-10° C. as in a refrigerator, the material becomes solid and acquires a more or less amorphous nature. However, at stages intermediate between a sirup-like stage and a hard solid, it frequently appears to be possessed of a stringy, grainy structure and sometimes crystals are in evidence. The chlorinated furfural prepared in accordance with the above illustrative example may be considered as a technical product and analytical data shows that it has a purity well in excess of 90%.

The quantity of chlorine taken up by the furfural as per the illustrative example is substantially that which is theoretically necessary to saturate the same to produce the unknown compound, tetrachlorfurfural. Our investigations have disclosed, however, that the chlorinated furfural of the present invention or in general, the halogenation products of the aldehydes of furan and its homologues or its equivalent analogues are seemingly not the monomeric compounds that one would anticipate. It appears that two aldehyde molecules enter into the formation of a single molecule of the halogenated product. Applicants have discovered a new class of chemical compounds.

The following is a typical chemical analysis for a chlorinated furfural of technical purity processed according to the above example so as to yield 35.2 to 36.6 parts of product.

|  | Found | Calculated (For $C_{10}H_{12}O_4Cl_8$) |
|---|---|---|
| Carbon_____per cent__ | 26.45 | 25.25 |
| Hydrogen_____do____ | 1.7 | 1.68 |
| Chlorine_____do____ | 58.75 | 59.70 |
| Oxygen_____do____ | 13.10 | 13.37 |
| Molecular weight (cryoscopically via benzene)_____ | 450-500 | 475.6 |

The values in the "Calculated" column are for a compound that would result from the condensation of two molecules of furfural and containing eight chlorine atoms.

Several determinations of the molecular weight gave a value of 474.

The elementary analysis of the technical chlorinated furfural is in substantial agreement with that of the probable formula of the octachlordifurfural compound. The percentage of chlorine is somewhat lower and the percentage of carbon is somewhat higher than the corresponding calculated values, but this can readily be explained upon the assumption that during the distillation step some chlorine either as such or as HCl was lost. The latter assumption has some experimental evidence in its favor and indeed there is a possibility that the chlorine in the fully chlorinated furfural exerts an appreciable vapor pressure so that at no time will 100% of the chlorine in the pure compound be fully tied up. Such an equilibrium reaction, if it exists, is of a nature such that at ordinary temperatures by far the larger part of the chlorine is tied up in the complex.

Research has shown that the afore-described chlorination product of furfural is present in that same state at the completion of the chlorination operation prior to the removal of the diluent—i. e., the compound does not come into being as a result of the operation of distillation.

For many purposes the solution that results from the chlorination of the aldehyde in the diluent may be used "as is."

The halogenation products of the aldehydes of the mono-heteroatomic five membered rings are in general characterized by an extraordinary reactivity. They are indeed few known organic compounds that possess a scope of reactivity that is comparable with that of these saturated halogenation products. Under proper conditions of environment, concentration, pressure, temperature, catalysis, etc., they can be made to react directly or indirectly with virtually all known organic compounds as well as with a very large number of inorganic substances. At ordinary temperatures the chlorination products of the aldehydes of the furans are quite stable and possessed of good keeping qualities although upon very prolonged standing, especially in the warm, an increase in the molecular weight is evidenced. The bromine and iodine derivatives appear to be less reactive than the chlorination products.

We do not know with any degree of certainty the precise chemical structure of the halogenation products of the present invention. Therefore, it is not possible at the present time to specifically refer to these products either generically or individually in terms of the orthodox chemical nomenclature. In the interest of clarity, therefore, the products of the present invention will be referred to as "halogenation (iodination, bromination, chlorination, and fluorination) products of the aldehydes of the mono-heteroatomic five membered rings" (furans, thiophens, and pyrroles). Terms such as "chlorinated furfural" are permissible and satisfactory provided that due cognizance is taken of the fact that this term has reference to the aforementioned halogenation products, as otherwise the term may ambiguously be construed to refer to a furfural which contains chlorine, whereas, as we have already indicated, our researches have indicated that this product of the present invention is not the expected tetrachloro-furfural but is, on the contrary, an octochloro compound into whose making there entered two original furfural molecules. It appears that all the other halogenation products of furfural, as well as its analogues and homologues, are likewise of the more complex type.

The following broad, generalized remarks pertain to the relative differences in the halogenation products of the aldehydes of the mono-heteroatomic five membered ring compounds:

From the standpoint of availability and general utility the chlorination product of furfural is of outstanding interest. The corresponding iodine, bromine, and fluorine compounds are much costlier and are with but few exceptions not possessed of properties that merit special consideration as against those of the more readily available chlorination product. Satisfactory fluorination products are produced only with difficulty. It is not certain whether the fluorination products in their entirety parallel the other halogenation products owing to the extraordinary reactivity of this halide and due to the fact that it is difficult to procure sizable samples upon which to carry out a thorough analysis.

In general the halogenation products of the aldehydes of the higher furans, e. g., mono methyl, mono butyl, and diethyl, etc., are quite similar to that of furfural except that as the molecular weight increases and as the number of hydrogen atoms of the furan structure that are substituted by alkyl or other radicals increases, or as the molecular weight of the substituting group increases, the over-all reactivity of these compounds is somewhat diminished as compared to the halogenation products of furfural. It appears that the halogenation products of furfural are on the whole potentially capable of a greater reactivity than those of the higher homologues of furfural.

The aldehydes of the thiophens are not well known and but few of these aldehydes have been prepared. Upon the basis of our studies, it appears that the saturated halogenation products are in some respects more stable and slightly less reactive than the corresponding furan derivatives.

But few of the aldehydes of the pyrroles are known—their synthesis is difficult and costly. Upon the basis of our studies, it appears that these compounds are the most unstable of the three mono-heteroatomic five membered rings that we have considered. The satisfactory halogenation of these aldehydes is somewhat erratic and difficult. There are indications that the imine hydrogen may enter into the reaction. In all probability, for the present and the immediate future the halogenation products of the pyrroles will play but a minor role as compared to the halogenation products of the furans, especially the chlorination product of furfural. It is not certain whether the halogenation product of the aldehydes of the pyrroles in their entirety parallel the furan derivatives due to the presence of imine hydrogen, etc.

In the ensuing discussions our remarks will center primarily around the saturated chlorination product of furfural. This compound is quite representative in its reactions and is the most readily available. Most of the remarks presented relative to this compound may in a large measure be aptly applied to the other halogenation products of the furans or its analogues—due allowances should be made for the differences in physical structure and chemical reactivity that may be ascertained from the difference in structure of the original aldehyde. These generalized functional differences are for the greater part well known to those versed in the art of organic chemistry.

Upon exposure to air chlorinated furfural skins to a slight depth. Prolonged exposure to air appears to induce a gradual, thorough decomposition, the material puffing up into a frothy mess which readily crumbles to a light yellow powder. In this process, acidic materials are evolved. Certain impurities, particularly metals, such as iron, and ultra violet light appear to accelerate the decomposition.

Chlorinated furfural may be heated in glassware to temperatures above 100° C. without undergoing appreciable immediate decomposition. However, at higher temperatures, it decomposes much more rapidly. At 200° C. the decomposition is very rapid. There are definite indications that upon standing for long periods of time or upon prolonged mild heating more or less polymerization occurs. For instance, the mean molecular weight of the chlorinated furfural upon prolonged standing or mild heating exhibits a marked increase.

Chlorinated furfural is substantially insoluble in water, although it is sufficiently soluble to impart a definite taste to the water. However, water gradually decomposes the chlorinated furfural so that if left in contact with water for a sufficient period of time it apparently undergoes more or less complete decomposition. Upon heating with water it is very readily decomposed, undergoing dehalogenation with the cleaving or splitting off of HCl.

Chlorinated furfural is, generally speaking, only slightly soluble in the higher aliphatic hydrocarbons, although it should be pointed out the halogenation product of the higher homologues and their analogues are, as is to be anticipated, more soluble, if not indeed readily soluble. Chlorinated furfural is readily soluble in most chlorinated hydrocarbons as well as in most aromatic hydrocarbons. Chlorinated furfural is readily soluble in all known ketones, esters, organic acids, alcohols, etc., etc. In the instance of these latter solvents, however, more or less reaction simultaneously occurs. However, by way of illustration it may be stated that in the cold, chlorinated furfural may be dissolved in cold methanol without undergoing appreciable immediate decomposition—on prolonged standing or upon the application of heat, reaction readily sets in.

Considering the unusual reactivity of the chlorinated furfural, it is not surprising to find that the material must not be allowed to remain in contact with the skin. Our laboratory experience indicates that the chlorinated furfural may contact the skin of the hands, face or neck over extended areas without any ill after-effects, provided that it is immediately rubbed off with a suitable solvent material such as acetone, toluol or alcohol. One may permit the chlorinated furfural to remain in contact with the skin for a period of as much as an hour without ill effects. If, however, one inadvertently permits the chlorinated furfural to remain in contact with the skin, especially the more tender parts, for a prolonged period of time, then large blisters will form and the skin is corroded away. Under normal circumstances the manufacturing operations involved in the making and the use of the product should be so laid out that there is no need for the chlorinated furfural coming in contact with the skin. The countless products that may be prepared by reacting chlorinated furfural with other reagents are possessed of a toxicity or nontoxicity peculiar to themselves, e. g., some such products are non-toxic, others slightly toxic, and others far more toxic than the original chlorinated furfural. Indeed some of these derivatives may be of interest from the standpoint of their use as so-called poison gases, cf. mustard gas.

Chlorinated furfural is a compound endowed with a most unusual chemical reactivity. It may be made to react either directly or indirectly with virtually all known organic compounds and with a large number of inorganic substances. When it is considered that chlorinated furfural is polyfunctional in character (a plurality of reactive chlorine atoms and probably other functionally reactive groups) it can readily be seen that via the use of chlorinated furfural and any one single reagent, it is possible to produce a large number of compounds depending upon the relative proportions, temperatures, etc. It therefore follows that via the use of chlorinated furfural, it is at least theoretically possible to synthesize many times as many organic compounds as are at present known. Due to the multitudinous reaction possibilities it is not practical to list even a small fraction of the possible reagents and reactions in the present specification. However, for illustrative purposes a number of representative examples will be given, particularly in a generic sense.

In considering the inorganic co-reagents it may be stated that chlorinated furfural reacts readily and violently with the free alkali and alkaline earth metals such as potassium, sodium, calcium, etc., as well as with all the other more readily oxidizable metals such as zinc dust, iron powder, copper dust, powdered magnesium, etc. It also reacts with the corresponding oxides and hydroxides and with all the alkali and alkaline earth salts whose acid component at reaction conditions is weaker than hydrochloric acid, e. g. hydrosulfuric acid. Chlorinated furfural reacts readily and violently with the hydrides and amines of the alkali metals and alkaline earth metals. It also readily reacts, often times preferably in the presence of a diluent, with the various carbides, e. g., calcium carbide. As is to be anticipated, this material readily reacts with all manner of organo metallic compounds such as zinc and magnesium metallo organic compounds. Chlorinated furfural also is effected by materials such as anhydrous alumina chloride, anhydrous ferric chloride, phosphorus pentoxide, phosphorus pentchloride, vanadium pentchloride, titanium pentchloride, boron chlorides, boron fluorides, nitric acid, sulfuric acid, $SO_3$, etc., etc. Chlorinated furfural readily reacts under a variety of conditions with materials such as the alkali metal or alkaline earth salts of nitric acid, nitrous acid, chloric acid, perchloric acid, bromic acid, perbromic acid, iodic acid, hydriodic acid, etc. Thus, chlorinated furfural can be made to react with sodium nitrate, sodium nitrite, sodium iodide, etc., to yield interesting reaction products.

Chlorinated furfural also reacts with water under a variety of conditions. In each case, a certain amount of dehalogenation occurs, HCl being given off. The nature of the ultimate product depends upon the quantity of water, the temperature, time, etc. Generally, at least two types of products come into being, one of which is water-soluble and the other of which is water-insoluble. The water may be in the fluid phase or in the vapor phase, and the chlorinated furfural may be in direct contact with the water, or it may be first dissolved in an inert solvent such as carbon tetrachloride or in a solvent such as xylene, which in the absence of a catalyst is substantially inert.

By way of specific examples, it may be stated that the reaction may be carried out by mixing chlorinated furfural with hot water, or by passing steam over and into the chlorinated furfural. Another way is to dissolve the chlorinated furfural in an inert or substantially inert diluent and to bring steam into contact with the solution.

The water appears to partially dehalogenate the chlorinated furfural to produce materials having a phenolic nature. Complex organic acids appear also to be formed. A greater degree of dehalogenation can be obtained by carrying out the reaction in the presence of calcium carbonate, e. g., as marble dust, or other alkaline agents or agents calculated to neutralize free acidity.

The water-insoluble products, which are generated in the reaction between chlorinated furfural and water in the absence or presence of material such as calcium carbonate, are but slightly soluble in the common organic solvents. They are, however, readily soluble in ether alcohols, particularly the methyl ether of ethylene glycol. The solution is of an intensely dark brown color. The insoluble product is fusible and upon the hot plate may be reacted with a wide variety of reagents.

The water-soluble products that result from the reaction between chlorinated furfural, water, and calcium carbonate are present in the form of calcium salts, which remain even upon acidulation with strong acids. They can be precipitated by the addition of a base such as ammonia water. The precipitated calcium salt is infusible upon the hot plate and insoluble in virtually all solvents. Strong acids react with this material to liberate the organic constituent, which is soluble with a very deep brown color.

The reaction products with water are probably possessed of a certain phenolic character, as one would anticipate from a replacement of chlorine atoms by the hydroxy groups of water. It is probably as a consequence of the mentioned functional attribute that these products are capable of "setting up" per se on the hot plate, i. e., they are capable of being converted or transformed from the original fusible to an infusible state. However, they set up much more readily in the presence of reactive methylene-group-containing substances. With hexamethylenetetramine, the products set up very readily to yield materials of fair strength. These products may also be incorporated into phenol-aldehyde resins and are useful as extenders and to an extent as hardening agents. These partial dehalogenation products of chlorinated furfural are also useful in the manufacture of certain types of dyestuffs, and in addition they react with so-called hardening agents and rubber accelerators as well as with most amines and polyamines to form infusible products. These reaction products are also of interest from the standpoint of their reactivity with high molecular weight compounds possessed of an appreciable unsaturation, e. g., synthetic rubbers, etc.

These partially dehalogenated derivatives of chlorinated furfural are of particular interest because their production does not involve the use of expensive reagents.

Referring to organic co-reactants, chlorinated furfural can be made to react with the aliphatic, carbocyclic and heterocyclic classes of organic compounds. The presence of specific functional groups, such as alcoholic hydroxy groups, phenolic hydroxy groups, carbonyl groups, amino groups, etc., facilitates the reaction. As a consequence, chlorinated furfural will combine more readily with alcohols, ketones, esters, amines, acids, nitro-derivatives, etc., than with the parent substances.

Chlorinated furfural can be made to react with all manner of aliphatic hydrocarbons whether saturated or unsaturated and non-aromatic carbocyclic compounds. It is often necessary to use a catalyst such as an aluminum halide to procure reaction. In many instances appropriate compounds of zinc, iron, antimony, arsenic, molybdenum, canadium, etc., exert a catalytic effect upon the reactions. Under appropriate conditions of thermal and chemical environment, chlorinated furfural can be made to react with alkanes, alkenes, alkadienes, alkapolyenes, alkynes, alkadiynes, alkapolynes, cyclanes, spiranes, bicyclanes, polycyclanes, cyclenes, bicyclenes, polycyclenes, etc. Chlorinated furfural can react more readily with compounds containing unsaturated linkages than with the fully saturated compounds. Hydrocarbons that are of a type that readily undergo auto-reaction, e. g., isomerization or polymerization, generally react either faster or more thoroughly than do the less reactive, more stable compounds.

Chlorinated furfural can be made to react with all manner of aromatic or carbocyclic compounds. Here too, the presence of a suitable catalyst such as an aluminum halide is desirable. Thus, the chlorinated furfural can be made to react with the alkyl benzenes, alkenyl benzenes, alkadienyl benzenes, alkapolyenyl benzenes, alkynyl benzenes, as well as with the condensed aromatics such as the indanes, indenes, fluorenes, naphthylenes, anthracenes, phenanthrenes, naphthacenes, aromatic-cyclane hydrocarbons, aromatic-cyclene hydrocarbons, aromatic-cyclodiene hydrocarbons, etc. All manner of compounds belonging to the so-called class of terpenes can be made to react quite readily with chlorinated furfural.

The products that are procurable via the reaction of chlorinated furfural with aliphatic or carbocyclic hydrocarbons are of a most diverse nature. As a rule, complicated mixtures of complex products come into being. In instances the reaction products are of a stable, fusible character and in other instances they are nonfusible. It should be noted that hydrogen chloride is almost invariably engendered in these reactions. In the instance of some of the more complex unsaturated hydrocarbons, a part of the hydrogen chloride may be absorbed into the complex by way of an addition reaction. The reaction products with but few exceptions are dark in color, a deep amber, brownish-black and black—in many instances, of course, via processes of distillation or decoloration in one manner or another, many of the products can be lightened.

Chlorinated furfural reacts quite readily with all manner of heterocyclic compounds. Specifically we here mention:

Mono-heteroatomic three membered rings (e. g., ethylene oxide, ethylene sulfide and ethylene imine).

Di-heteroatomic three membered rings (hydrazi- and azmethylene group, and diazomethane).

Mono-heteroatomic four membered rings (trimethylene oxide and trimethylene imine).

Di-heteroatomic four membered rings (betaines, thetines, methylene urea, and methylene thiourea).

Mono-heteroatomic five membered ring (furans, thiophens, pyrroles, coumarones, thionaphthenes, indoles, diphenylene oxide group, diphenylene sulfide group, dibenzo pyrroles, etc).

Poly-heteroatomic five membered rings (pyrazoles, indazoles, isoxazoles, indoxazenes, glyoxalines, benzoglyoxalines, oxazoles, benzoxazoles, thiazoles, benzothiazoles, osotriazoles, pyrro-diazoles, furazans, azaximes, oxydiazoles, furo-diazoles, thio-diazoles, thio-triazoles, and tetra azoles).

Mono-heteroatomic six membered rings, e. g., six membered rings with an oxygen member (pyrones, benzo derivatives, coumarins, flavone, luteolin, xanthene, fluoranes, xanthone, etc.); six membered rings containing a nitrogen member (pyridine group, e. g., pyridines, halogen pyridines, sulphonic acids, nitropyridines, pyridones, thiopyridines, pyridyl alcohols, pyridyl ketones, pyridine carboxylic acids, oxy-pyridine carboxylic acids, hydropyridines, piperideines, piperidines, quinolines, condensed quinolines, isoquinolines, phenanthridines, naphthyridines, quindolines, acridines, anthrapyridines); poly-heteroatomic six-membered rings (oxazines, thiazines, diazines, triazines, tetrazines); poly-heteroatomic six membered rings which contain both oxygen and sulphur members as well as the vegetable alkaloids.

The products that result from the reaction between chlorinated furfural and heterocyclic compounds (often in the presence of a catalyst) are of the most diverse nature imaginable. Generally speaking, however, these reaction products, prior to purification, are dark in color and all contain more or less chlorine. Some of the compounds are fusible, others are non-fusible, and almost invariably they are of a higher complex nature. These reaction products like those of the other hydrocarbons serve as useful intermediaries for the production of other compounds and are of interest from the standpoint of resins, rubbers, pharmaceuticals, dyestuffs, insecticides, etc., etc.

The introduction of a non-hydrocarbon reactive functional group into a molecule of a hydrocarbon facilitates the potential reactivity of the resultant substituted compound with chlorinated furfural. The greater the number of such functional groups present in the molecule of the reactant, the more readily it reacts. Generally speaking, chlorinated furfural will react with many hydrocarbons which contain non-hydrocarbon substituting groups, often quite readily upon heating in the absence of a catalyst. Chlorinated furfural will react in this wise with all manner of non-hydrocarbon substituted organic compounds. Specific mention may be made of the following representative classes of compounds:

Chlorinated furfural can be made to react with the halogenation derivatives of the hydrocarbons, irrespective of whether they be saturated or unsaturated aliphatic carbocyclic, heterocyclic or mixed.

Chlorinated furfural can be made to react with all the oxidation derivatives of the aliphatic hydrocarbons including the monohydric alcohols, unsaturated alcohols, olefine alcohols, acetylene alcohols, diolefine alcohols, simple and mixed ethers and esters of mineral acids, sulphur derivatives of alcohol radicals, selenium, tellurium, nitrogen and phosphorous derivatives of the alcohol radicals, alkyl derivatives of arsenic, antimony, boron, silicon, germanium and tin, metallo organic compounds, all manner of aldehydes whether aliphatic, carbocyclic or heterocyclic, ketones including their halogenation substitution products, peroxides (ethers and esters), sulphur derivatives, nitrogen derivatives, as well as the olefines and diolefine aldehyde and ketones.

Chlorinated furfural can be made to react with the mono and poly basic carboxylic acids of the saturated and unsaturated type whether aliphatic, carbocyclic or heterocyclic, also their anhydrides and nitriles.

Chlorinated furfural reacts quite readily with the dihydric alcohols and their oxidation products, e. g., glycols, (ethers and esters), thio compounds, nitrogen derivatives, aldehyde alcohols, ketone alcohols, ketols, di-aldehydes, ketone aldehydes, di-ketones, carboxylic acids, hydroxy olefine acids, aldehyde acids, ketonic carboxylic acids (whether saturated or unsaturated), as well as their innumerable haloid, sulphur and nitrogen derivatives.

Chlorinated furfural readily enters into the reaction with the tri-hydric alcohols, di-hydroxy ketones, hydroxy di-aldehydes, hydroxy aldehyde ketones, hydroxy ketones, di-aldehyde ketones, aldehyde di-ketones, tri-ketones, di-hydroxy monocarboxylic acids, monoamino-carboxylic acids, monoaminothiocarboxylic acids, dimonoaminocarboxylic acids, dihydroxy olefine monocarboxylic acids as well as their esters, etc.

Chlorinated furfural may be reacted with penta-, hexa-, and polyhydric alcohols and their oxidation products, e. g., pentitols, aldopentoses, hexitols, heptahydric alcohols, oxyhydric alcohols, monohydric alcohols, polyhydroxy aldehydes and ketones, aldohexoses, ketohexoses, aldoheptoses, aldo-octoses, aldononses, hexaketones, as well as the various carboxylic acids, ethers and esters that are derivable from the above polyhydric alcohols. Included in this category are all the various sugars, starches, etc.

Chlorinated furfural reacts with all manner of proteins and albuminous substances.

Chlorinated furfural can be made to react with substantially all the derivatives of the carbocyclic compounds, e. g., the derivatives derivable from the tri, tetra, penta, hexa, hepta, octo and nono-carbocyclic compounds. Thus, it can react with the non-hydrocarbon substitution products of the mono-nuclear aromatic substances, e. g., the halogen derivatives, nitrogen derivatives including the nitro and nitroso derivatives, hydroxylamines, nitrosohydroxylamines, anilines, diamines, nitrosamines, nitramines, diazo compounds, diazo-amido-compounds, diazo-oxy-amido-compounds, ozoxy-compounds, azo-compounds and hydrazine compounds. Chlorinated furfural can be made to react with the aromatic compounds of phosphorous, arsenic, antimony, bismuth, boron, silicon, tin as well as with the metals derivatives such as magnesium biphenyl, aryl-magnesium haloids, mercury diphenyls, etc. Chlorinated furfural can react with all the sulfonic acids and all their derivatives, phenols, quinones, aromatic alcohols, and their oxidation products, e. g., the phenyl-paraffin alcohols, aromatic mono-aldehydes, aromatic mono-ketones, aromatic mono-carboxylic acids, and aromatic polycarboxylic acids as well as their innumerable derivatives including the esters, acids, haloids, acid anhydrides, acid peroxides, thio-acids and bi-thio-acids, acid amides, acid hydrazides, acidyl-azides, nitriles, amido-haloids, imido chlorides, phenyl-hydrazine-imido-chlorides, imido-ethers of the aromatic acids, thiamides of the aromatic acids, imido-thio-ethers and the amidines of the aromatic acids, di-oxy-tetra-azotic acids, hydrazidins, nitrazones, nitrotrosazones, phenyl-azoxines, formazyl derivatives, hydroxamic acids, ethers and esters, haloids of the benzo-hydroxamic acid, benzo-nitrolic acid, benzo-nitrolisic acid, nitrile oxides, amidoximes, hydrazidoximes, hydraxamoximes, ethyl ortho benzoic esters, benzo-trichlorides and trifluorides, ortho benzoic acid piperidides, and various other substituted aromatic acids. Chlorinated furfural can be made to react with the oxy-phenyl-paraffin alcohols and their innumerable alcohols, aromatic oxy-mono-aldehydes, phenyl-ketones, phenyl-carboxylic acids, polyhydric aromatic alcohols in which one or more hydroxyl groups are present in each side chain as well as their oxidation products, aromatic substances with unsaturated side chains, e. g., olefine benzenes, acetylene benzenes, di-olefine benzenes, olefine-acetylene-benzenes, olefine-phenols, acetyl-anisols, phenyl-olefine alcohols, and their oxidation products, oxy-phenyl-olefine-carboxylic acids, as well as the oxidation products of aromatic poly-alcohols with unsaturated side chains, e. g., phenylene-oxy-olefine-carboxylic acids, phenyl-diolefine-a-keto-carboxylic acids, cyanocinnamic acid, phenylene-oxy-olefine-dicarboxylic acids.

Chlorinated furfural may be made to react with all manner of hydro-aromatic substances with one or more nuclei including all their derivatives and substitution products, e. g., the halogen, nitro and amino substitution products of the cyclohexanes, hexa-hydro-benzenes, naphthenes, cyclo-hexanes, tetra-hydro-benzenes, naphthylenes, dihydro-benzenes, cyclo-hexa-dienes, ring alcohols of the hydro-aromatic hydrocarbons, e. g., cyclo-hexanol, quinite, quercite, inosite, phenose, the ring alcohols of the tetra-hydro-benzenes, extra cyclo-hydro-aromatic alcohols as well as their derivatives, ring amines of the hydro-aromatic hydrocarbons, e. g., amido-cyclo-hexanes, extra cyclohydro-aromatic amines, ring ketones of the hydro aromatic hydrocarbons, hydro-aromatic aldehydes, e. g., cyclo citral, extra cyclo-hydro-aromatic ketones, hydro-aromatic carboxylic acids, e. g., hydro-aromatic monocarboxylic acids, hexa-hydro-oxy-benzoic acids, quinic acid, skikimit acid, succino-succinic acid.

Chlorinated furfural, as has already been pointed out, can be made to react with all manner of terpenes, e. g., the olefinic terpene group (myrcene, ocimene, isotrene, as well as their various haloid substitution products, etc.), the olefinic terpene alcohols, olefinic terpene aldehydes, olefinic terpene acids, monocyclic terpenes, e. g., limonene, terpinolene, terpinene, phellandrene, alcohols of the monocyclic terpenes, e. g., menthane alcohols, secondary menthols, tertiary menthols, mono, di, and poly-acid alcohols, bases and ring ketones of the monocyclic terpenes. Chlorinated furfural quite readily reacts with the dicyclic terpenes as well as the sesqui terpenes and polyterpenes, e. g., thujene, sabinane, carone, eucarvone, pinene, turpentine oil, terebinic acid, myrtenol, pinol, camphene group comprising camphene bornylene, fenchene, borneol, iso-borneol, camphor, fenchone, cadinene, santalol, caoutchouc.

Chlorinated furfural can be made to react with all manner of aromatic hydrocarbons containing several nuclei, e. g., phenyl benzols, and the polyphenyl fatty hydrocarbons and all their derivatives and substitution products including the phenyl-benzoles, benzo-benzoles, triphenyl methanes, phenyl derivatives of the triphenyl carbinols, phenyl-bis-di-phenyl-methanes, tetra-phenyl-methanes, homologous di- and polyphenyl paraffins and the condensed nuclei type and all their derivatives.

We have already pointed out that the presence of a non-hydrocarbon functionally reactive group in a hydrocarbon molecule further enhances the reactability and the reaction possibilities with chlorinated furfural. Specifically it may be stated by way of example that a hydrocarbon compound containing one or more of the following structural groupings, complexes, or radicals will in general react either more readily, more thoroughly, or in a more profound manner with chlorinated furfural than its original progenitor. For convenience, these functional typical groups have been listed in alphabetical order:

| | |
|---|---|
| Acetal | Anilino |
| Acetamido | Antimono |
| Acetimido | Arseno |
| Acid anhydride | Arsenoso |
| Acid halide | Arsinico |
| Alcoholis OH group | Arsino |
| Aldehyde group | Arso |
| Aldo | Arsono |
| Alkyl thio | Arsylene |
| Amide | Azimino |
| Amidoxime | Azido |
| Amino | Azino |
| Amine | Azo |
| Amoxy | Azoxy |

| | | |
|---|---|---|
| Benzamido | Phenetyl | Uramino |
| Benzimido | Phenoxy | Ureido |
| Biphenylenediazo | Phenyl | Ureylene |
| Boryl | Phenylenediazo | Vinyl |
| Bromo | Phenylidene | Vinylene |
| Carbonyl | Phenylureido | Vinylidene |
| Carbylamine | Phosphorseno | Xanthyl |
| Carbonyldi-oxy | Phosphazo | |
| Chloro | Phosphinico | |
| Chloromercuri | Phosphino | |
| Cyano | Phospho | |
| Cyanid | Phosphono | |
| Cyanate | Phosphoro | |
| Diazo | Phosphoroso | |
| Diazo-amino | Phthalal | |
| Diazotate | Phthalamido | |
| Diazonium | Phthalidene | |
| Diazoxy | Picryl | |
| Dithio | Piperidyl | |
| Disulfide | Piperonyl | |
| Epoxy | Piperonylidene | |
| Ester | Propargyl | |
| Ether | Propenyl | |
| Ethylidene | Propenylidene | |
| Ethylidyne | Propronyl | |
| Ethynyl | Propylidene | |
| Ethynylene | Pyrazolyl | |
| Fluoro | Pyridyl | |
| Formamido | Pyridylidene | |
| Formazyl | Pyrimidyl | |
| Guanido | Pyrroyl | |
| Guanyl | Pyrryl | |
| Halogeno | Selenino | |
| Hydrazide | Seleninyl | |
| Hydrazi | Seleno | |
| Hydrazino | Selenocyano | |
| Hydrazo | Selenono | |
| Hydrazono | Selenocyano | |
| Hydroxamino | Selenyl | |
| Isonitroso | Semicarbazido | |
| Imidazolyl | Silicono | |
| Imino | Silicyl | |
| Iodo | Silicylene | |
| Iodoso | Stannyl | |
| Iodoxy | Stibarseno | |
| Isocyano | Stibinoco | |
| Isodiazo | Stibino | |
| Isonitro | Stibo | |
| Isonitroso | Stibono | |
| Isothiocyano | Stiboso | |
| Isoxazoyl | Stibylene | |
| Keto | Sulfamino | |
| Lactam | Sulfino | |
| Lactide | Sulfinyl | |
| Lactone | Sulfo | |
| Mercapto | Sulfonamido | |
| Mercuri | Sulfonic | |
| Methionyl | Sulfonyl | |
| Methylene | Sulfunic | |
| Methylenedioxy | Telluro | |
| Methylidyne | Tetrazyl | |
| Nitramino | Theonyl | |
| Nitrilo | Thiazyl | |
| Nitro | Thienyl | |
| Nitroso | Thio | |
| Oxalyl | Thiocarbonyl | |
| Oxamido | Thiocyano | |
| Oximido | Thiohydroxy | |
| Oxo | Thiol | |
| Oxy | Thiono | |
| Pentazyl | Thionyl | |
| Perthio | Triazeno | |
| Phenetidimo | Triazinyl | |
| Phenolic | Triazo | |
| Phenylazo | Triazolyl | |

Many of the products are suitable for further reaction with other reagents and in this manner serve as intermediates for the production of a wide variety of materials. Many of these reaction products are of interest from the standpoint of resins, plasticizers, softeners, paint, varnish and lacquer ingredients, extenders for resins and rubber, as compounding ingredients in the production of plastics, resins, synthetic rubbers, insecticides, pharmaceuticals, photographic chemicals, tannin materials, etc.

As may readily be seen from a study of the above representative list of compounds or classes of compounds with which the chlorinated furfural can be made to react, this latter compound is indeed possessed of an extraordinary reactivity. It is no exaggeration to say that this compound may be made to react with virtually all known organic compounds. This unusual reactivity is, of course, associated with the reactive functional groups that are present in the chlorinated furfural. This unusual reactivity is perhaps to be expected from a consideration of the fact that even relatively highly stable substances such as ethyl chloride or monochlor benzene can, under appropriate conditions, be made to react or combine with other materials. Chlorinated furfural reacts with water or the moisture of the air and with alkaline materials such as ammonia or the alkali metal or alkaline earth oxides or hydroxides or with organic bases such as aniline or polyamino compounds, often in a very violent, almost explosive manner.

In the ensuing paragraphs we shall attempt to set forth a few illustrative examples of specific reaction products of chlorinated furfural, more with the view of showing their practical utility than as detailed procedures of how to carry out the reactions.

Chlorinated furfural in the presence of moisture or certain other agents splits off HCl and thus produces an acidic environment. This reaction may be capitalized by utilizing the chlorinated furfural as an acid catalyst or as an acidifying medium for specific applications. Thus, chlorinated furfural is of value as an acid catalyst in the curing up of urea resins, phenol-furfural resins, etc. Otentimes it is desirable to dilute or partially react the chlorinated furfural with some other agent or include an "activator" to obtain a material which may be more desirable from the point of view of handling, sensitiveness, or speed of reaction. Thus, chlorinated furfural may be reacted with rosin to yield a greenish colored composition to which some activated carbon and finely divided red iron oxide may be added. The resultant composition, when finely ground up, functions exceedingly well as a curing catalyst to accelerate the curing of phenol-furfural resins.

In many applications it is desirable to utilize a material as a catalyst, or otherwise, that is less potent in its acidic potentialities than the chlorinated furfural per se. Such products can readily be produced by reacting chlorinated furfural with appropriate reagents which are calculated to bring about a greater or lesser degree of dehalogenation. Thus, by reacting chlorinated furfural with alcohols, water, or with basic materials, depending upon the quantitative and qualitative considerations, an almost endless number of useful products may be obtained.

Chlorinated furfural is of interest in the production of alkyl halogen compounds especially those of the lower aliphatics. Thus, via refluxing chlorinated furfural with methanol or ethanol one can readily procure excellent yields of methyl chloride or ethyl chloride. Methyl chloride or ethyl chloride may also be produced by reacting chlorinated furfural with the corresponding ethers or the ether-alcohols, e. g., the methyl ether of ethylene glycol. The methyl and ethyl chlorides as is well known, are very useful in reactions involving methylation or ethylation and in the production of tetra ethyl lead.

Ethers of chlorinated furfural are readily produced by reacting the same with alcohols, e. g., by reacting chlorinated furfural with methanol, partial dehalogenation occurs along with the formation of a polymethoxy ether. Using the proper proportions of methanol and sufficient time for reaction, it is possible to procure a fairly stable end product which may be distilled under high vacuum. This type of product may be reacted with materials such as Formalin, formaldehyde, toluidine, various guanidines, monoamines, polyamines, etc., to yield fusible resinous products.

Distillable products are also procurable by reacting chlorinated furfural with methanol in the presence of calcium carbonate.

Dehalogenated, oxyginated ether compounds may be procured by reacting chlorinated furfural in the presence of an alcohol, and an alkali hydroxide or alkoxide. In this manner it is possible to procure highly stable poly-ethers which are distillable at elevated temperatures under high vacuums to yield light colored liquids.

It is possible to dehalogenate chlorinated furfural via the use of methanol so as to procure a product containing but a single chlorine atom and a plurality of methoxy groups.

A wide variety of products may be procured by reacting chlorinated furfural with the alkali metal salts of organic acids, e. g., anhydrous sodium acetate in the presence of methanol.

By reacting chlorinated furfural in the presence of water and alkaline materials, it is possible to procure a wide variety of products including some which contain hydroxy groups. Many such compounds under the influence of heat, cure up to yield thermo-rigid infusible products.

By reacting chlorinated furfural with polyfunctional compounds, e. g., ethylene glycol, glycerol, the ethers of ethylene glycol, etc., it is possible to procure end products which are more or less resinous and at times somewhat rubbery in character. Such materials are of value as extenders and modifiers for resinous compositions as well as for natural and synthetic rubbers. The reaction product procured from the methyl ether of ethylene glycol is of particular interest in that it is highly compatible with synthetic rubbers, polyvinyl acetate, polyvinyl chloride, polyvinyl alcohol, polyvinyl acetals, etc. With certain types of rubbers, these products act as stiffening agents.

One of the remarkable attributes with which the saturated halogenation products of the aldehydes of the mono-heteroatomic five membered rings are endowed resides in the ability of these compounds to react with complex unsaturated compounds, e. g., natural rubber and all the synthetic vulcanizable rubbers. Thus, via the use of chlorinated furfural or appropriate derivatives thereof, it is possible to supplant sulphur, the time-honored vulcanizing medium, to procure most excellent vulcanizates. Indeed in this wise it is possible to procure vulcanizates out of Hycar OR (a butadiene copolymer synthetic rubber) which are vastly superior in the way of tensile strengths and elongations to corresponding vulcanizates made with sulphur. It is believed that these discoveries will exert a far reaching effect upon the synthetic rubber industry. In many applications vastly superior results are procured via the use of derivatives of chlorinated furfural in lieu of the material per se. Thus, by reacting chlorinated furfural with such diverse substances as monohydric alcohols, polyhydic alcohols, aldehyde alcohols, ketone alcohols, ketones, etc. an almost endless number of new vulcanizing agents may be obtained. Via the use of these reagents one may procure vulcanizates which, when compared with those procured via the use of sulphur, are vastly superior in the way of tensile strengths, elongations, modulus, resistance to flex cracking, tear resistance, heat resistance, etc. Indeed laboratory specimens with tensile strengths of over 6,000 lbs. per square inch with elongations of 500% or better have been procured in this manner.

Many of the products derivable from chlorinated furfural are useful as plasticizers or softeners for a wide variety of products including synthetic yarns, synthetic fibers, natural and synthetic gums, natural and synthetic resins and plastics, natural and synthetic rubbers, paints, varnishes, lacquers, printing inks, etc., etc.

One of the novel and peculiar characteristics with which chlorinated furfural and products of its type are endowed is that they permit one to procure plasticizers or softening agents which are potentially reactive and which, dependent upon the circumstances, may via a heat treatment or via inter-reaction with some other reagent be converted into a non-plasticizer or non-softener. Thus, it is possible to procure derivatives out of chlorinated furfural which function as solvents or latent solvents or plasticizers for thermoplastic resinous materials such as cellulose esters, cellulose ethers, polyvinyl resins including polyvinyl acetate, polyvinyl chloride, polyvinyl acetate-chloride and polymers or interpolymers, polyvinyl alcohols, polyvinyl acetals, e. g., polyvinyl butyral, polystyrols, poly-acrylates, poly-methacrylates, etc. Upon an appropriate heat treatment or alternatively via the inclusion of suitable co-reagents for the chlorinated furfural derivative in question or via the use of such a co-reagent plus an adequate heat treatment, it is possible to transform the said chlorinated derivative over into a non-plasticizer or non-thermoplastic product and thus the composition "in toto" will take on a higher melting point or a higher softening point and acquire a greater degree of thermo-rigidity. Hence, in this manner it now becomes possible to produce plastics which are possessed of an initial low softening point permitting ready processing, e. g., molding, extrusion, injection, etc., but which after a subsequent heat treatment, can be converted into a composition possessed of a relatively high softening point. To the best of our knowledge it has not hitherto-fore been possible to attain these same ends.

Via the use of some of the more reactive derivatives of chlorinated furfural or its homologues or analogues it is possible to procure materials which may initially function as plasticizers but which, via an appropriate heat treatment, react with the resin that they have plasticized or co-plasticized to convert the same over into a non-thermoplastic state. For example, chlorinated furfural, per se, as well as many of its derivatives such as those produced by reacting the same with alcohols, ethers, ketones, etc., often preferably in the presence of an acid absorbent such as calcium carbonate are capable of further reaction not only with monomeric alcohols, aldehydes, acetals, etc., but can also react with poly-alcohols, poly-esters, poly-acetals, etc. Thus, via the use of appropriate derivatives of chlorinated furfural or, in the more general sense, of the saturated halogenation products of the mono-heteroatomic five membered rings, one may procure materials which are capable of reacting with and "hardening," "curing," or "vulcanizing" such materials as polyvinyl alcohols and polyvinyl acetals, (e. g., the formal, acetal, propional, or butyral, acetals of polyvinyl alcohols). In this wise it becomes possible to procure thermo-rigid compositions out of these nominally thermoplastic substances. With appropriate formulations, it is possible to procure flexible, elastic articles which are very similar to rubber compositions and may be used in lieu of rubber, often with great advantage. Thus, via the use of chlorinated furfural or its derivatives, it becomes possible to procure vulcanizable products, which may be referred to as synthetic rubbers, out of what were hitherto looked upon as essentially thermoplastic materials.

The present inventors have experimentally ascertained the fact that saturated halogenation products of the aldehydes of the mono-heteroatomic five membered rings such as the chlorinated furfural as well as numerous reactive derivatives thereof are capable of entering into reaction with monohydric alcohols, dihydric alcohols, polyhydric alcohols, sugars, starches, cellulosic materials, monohydric phenols, polyhydric phenols, all manner of fusible phenol-aldehyde resins, polyvinyl alcohols, polyvinyl acetals which contain alcoholic (OH) groups, etc. With the above facts as a basis, the present inventors concluded that the reaction between such halogenated aldehydes and suitable derivatives thereof with compounds containing hydroxy (OH) groups was quite general in character. The inventors further reasoned that if one introduced an adequate number of hydroxy (OH) groups into any type of organic compound, the same should lend itself to more ready reaction with halogenated aldehydes such as those described in the present invention as well as appropriate derivatives thereof. These theorizations, they were indeed able to substantiate, culminating in the important discovery that by introducing an appropriate number of (OH) groups into such thermoplastic products as polyvinyl acetate, polyvinyl chloride, vinyl ethers, resins derived from indene and coumarone, petroleum resins, hydrocarbon resins, etc., etc., it was possible to procure compositions which became susceptible to reactions variously described as "setting up," "hardening," "curing" and "vulcanization" via the use of the halogenated aldehydes of the present invention as well as appropriate derivatives thereof.

In its broadest aspects, the present inventors have discovered a method of imparting to linear polymers the functional attribute of being convertible to a thermo-rigid or a vulcanized state via the use of halogenation products of the aldehydes of the mono-heteroatomic five membered rings or suitable derivatives thereof. The process comprises the steps of introducing an appropriate number of (OH) groups into the linear polymer which may be non-orientated, e. g., resinous, orientated, e. g., fibrous, or rubbery and then reacting the same with a halogenated aldehyde of the type disclosed in the present invention or appropriate derivatives thereof, and in this wise achieving a "setting up," "curing," "hardening" or "vulcanization" of the same.

One of the revolutionary aspects of these discoveries resides in the fact that it places in the hands of the technician a new technological development, which permits the synthesis of new types of resins and synthetic rubbers. By way of illustration, in the synthesis of synthetic rubbers it has heretofore always been the endeavor of the chemist to synthesize linear hydrocarbon polymers which contain a few cross linkages here and there and, what is of paramount importance, to include an appropriate degree of unsaturation so that the compound was capable of combining with appropriate "vulcanizing" agents such as sulphur to further cross link and set up the mass and thus effect the "vulcanization." Following the teachings of the present inventors, it becomes unnecessary to incorporate unsaturation into a prospective synthetic rubber, and in lieu of the said unsaturation, one may introduce an appropriate number of (OH) groups, which latter are capable of reacting with the poly-functional halogenated aldehydes of the present invention or appropriate derivatives thereof. As a specific citation, poly-isobutylene (Vistanex) is well known as a non-vulcanizable thermoplastic rubbery material. By modifying the same so as to include a desirable degree of unsaturation, as may be achieved by polymerizing the isobutylene in the presence of a di-olefin such as butadiene, one may produce a vulcanizable synthetic rubber, e. g., butyl rubber. Such synthetic rubbers are capable of being vulcanized not only by sulphur and various other known rubber vulcanizing agents, but also by the halogenated aldehydes of the present invention and reactive derivatives thereof. However, it has now been discovered that by introducing into poly-isobutylene an appropriate number of hydroxy (OH) groups the resultant compound, while substantially non-vulcanizable via sulphur, can readily be vulcanized via the use of the afore-described halogenation products. (In the instance of poly-isobutylene, hydroxy (OH) groups may readily be introduced by chlorinating the said isobutylene and then saponifying the resultant chloro compound.) In lieu of the above poly-isobutylene, one may utilize isobutylene-butadiene copolymers, e. g., butyl rubber, by chlorinating the same and then saponifying—the resultant product is susceptible to vulcanization via the use of the herein-described halogenated aldehydes, etc.

By utilizing the foregoing principles, one may also render vulcanizable or curable to the state of thermo-rigidity such nominally thermoplastic products as polyacrylates, polymethacrylates, polystyrenes, polymerized olefines, hydrocarbon resins, acetylene resins, all types of polyvinyl products, ethylene resins, and ethenoid resins. Halide containing linear polymers or halide containing hydrocarbon polymers are in many instances preeminently suited for conversion to hydroxylated products, which are suceptible to either curing to a non-rubbery thermo-rigid state or to the production of flexible elastic rubbery products. The polymerized products procured via the chlorination followed by the dechlorination, either prior to or subsequent to the polymerization of hydrocarbons, likewise lend themselves to the above processing.

The polyethylene oxides, alkyd resins, and in general the so-called modified alkyd resins all lend themselves to hydroxylation and concomitant therewith become susceptible to a reaction akin to "curing," or "vulcanization" by the use of the herein-described halogenated aldehydes, etc.

The animal and vegetable oils, fats, waxes, and fatty acids as well as their synthetic equivalents, including the nitriles, are susceptible to hydroxylation and subsequent vulcanization or cure. Hydroxylated natural or synthetic drying oils may, if desired, be subjected to oxidation, condensation, or polymerization prior to cure or vulcanization by the use of the herein-described halogenated aldehydes or their reactive derivatives.

By reacting chlorinated furfural with anhydrous sodium acetate in the presence of methanol, one may procure chloro-polyacetyl compounds which may contain methyl ether groups. Some such products are of unusual interest in that they will react with various aldehydes including formaldehyde, para-formaldehyde, hexamethylenetetramine, furfural, etc. to yield compositions which set up after the manner of the well known phenol-formaldehyde reaction products. These products are of interest in that, while partaking of the character of phenol-formaldehyde resins, are among the first such products to be produced without the actual use of a phenol as a raw material.

Chlorinated furfural can be made to react with all kinds of animal and vegetable oils, fats, waxes and their fatty acids. As specific examples may be mentioned palm oil, coconut oil, cottonseed oil, rapeseed oil, perilla oil, linseed oil, castor oil, soya bean oil, fish oil, lard, cashew nut shell liquid, menhaden oil, sperm oil, rosin oil, pine oil, etc., as well as the corresponding fatty acids. Such reaction products may be procured in the form of infusible somewhat elastic materials which are suitable for the manufacture of brake linings and friction elements in general. In these reactions considerable quantities of substantial anhydrous hydrogen chloride gas are involved.

The reaction product between chlorinated furfural and rosin is hard character and is possessed of a drab olive green color. This compound is interesting in that it possesses a tendency to gradually liberate hydrogen chloride and upon the application of heat, the liberation of HCl is enhanced. Ferrous chloride acts as an activator for the evolution of HCl.

We have already pointed out that chlorinated furfural and its derivatives may function as acidic accelerators for the curing of resins. However, entirely aside from such catalytic action, chlorinated furfural and its appropriate derivatives, due to their tremendous activity, also acts as a hardening agent for a wide variety of synthetic resins, particularly those of the thermosetting type. Chlorinated furfural, particularly when activated by ferrous chloride, is an excellent hardening agent for the so-called furfur-acetone resins.

Chlorinated furfural and its derivatives may be reacted with natural or synthetic rubbers to produce a wide variety of interesting compositions.

Many of the derivatives of chlorinated furfural are highly useful as reactants with proteins, albuminoids, etc. Some of the derivatives function as tanning agents.

Chlorinated furfural and many of its homologues and analogues and derivatives are more or less toxic and they are useful in the preparation of insecticides, agricultural sprays, germicides, etc.

Countless of the derivatives of chlorinated furfural and its homologues and analogues owing to their highly diversified and reactive nature are useful for the manufacture of dyestuffs, pharmaceuticals, chemical intermediates, photographic chemicals, explosives, resins, plastics, etc.

In carrying out a reaction between chlorinated furfural and another compound, it is necessary to take into consideration the chemical nature of the reactants and to supply the necessary environment, either from the standpoint of thermodynamics or catalysis. Thus, chlorinated furfural reacts quite readily and smoothly with simpler alcohols, aldehydes, ketones and esters. On the other hand, to initiate the reaction or to obtain an appreciable reaction velocity in the instance of reactants such as benzene, naphthalene, diisobutylene, styrol, Sunoco Spirits, gasoline, etc. the presence of suitable catalysts such as anhydrous aluminum chloride, etc. is necessary. Then again, in the case of the amines, the alkali and alkaline earth metals, as well as materials such as zinc dust, the reaction occurs almost spontaneously, and is so violent that it proceeds more or less in the nature of an explosion, making the control of the reaction most difficult. It is, therefore, preferable to carry out the reaction in the presence of either an inert diluent such as carbon tetrachloride or a material which reacts at but a slow rate, such as an alcohol. Compounds such as tetraethylenepentamine react with the chlorinated furfural with substantially explosive violence. Such materials may be diluted with alcohol or carbon tetrachloride, in which case the reaction proceeds quite smoothly.

In many instances the nature of the end products and the characteristics and course of the reaction may be greatly altered by changing the environment, either with respect to the temperature, the presence or absence of a catalyst or the presence or absence of a diluent. Quantitative considerations, of course, also alter the nature of the reaction and the end products. For example, when chlorinated furfural is dehalogenated in cold methanol solution by the addition of alcoholic potash, the degree of dehalogenation will be largely dependent upon the quantity of potash employed. As was previously pointed out, the reaction between water and chlorinated furfural can be carried out under other reaction conditions, as for instance, by passing steam into chlorinated furfural dissolved in an inert solvent.

For many purposes, where the potential reactivity of the chlorine atoms in the chlorinated furfural is to be utilized, it is found that the chlorinated furfural per se is far too reactive, leading to uncontrollable reactions. In such cases, it has been found that many of the derivatives of the chlorinated furfural, particularly those which are essentially of a partially dehalogenated nature, such as the products resulting from the reaction between chlorinated furfural and water, alcohols, ketones, basic substances, etc., are far more suitable. Many of these products are still capable of very readily entering into reaction with all types of organic bases such as the various amines.

In many of the reactions of chlorinated furfural, hydrogen chloride is split off in lieu of water, as when reacting ordinary alcohols, etc. This hydrogen chloride may run into considerable quantities and may be utilized in various ways. Thus, the HCl may be absorbed in water for the production of commercial grades of hydrochloric acid, or it may be mixed with air and heated in the presence of a suitable catalyst to produce chlorine gas. The resultant chlorine may then be utilized for the production of more chlorinated furfural. Of course, the HCl may be used in its anhydrous form for many commercial applications for which aqueous hydrochloric acid is unsuited.

In many of the reactions the chlorine appears in the form of an organic chloride, e. g., when utilizing methanol or methyl "Cellosolve" pure methyl chloride is obtained. In an analogous manner, ethyl, propyl, isopropyl and butyl chlorides may be obtained. In many instances, the organic chloride is formed in almost theoretical quantities. Hence, these reactions provide a very convenient way of preparing organic chlorides for demonstrative or class room uses as well as for commercial purposes. In the instance of the more complex unsaturated derivatives a portion or all of the chlorine may be re-absorbed into the complex by way of an "addition" reaction.

It is thought to be clear from the foregoing disclosure that the saturated halogenation products of the mono-heteroatomic five membered rings and especially chlorinated furfural and its numerous derivatives constitute a novel and unique class of chemical compounds having an exceedingly wide range of useful industrial applications. Compositions containing saturated halogenation products of the aldehydes of the mono-heteroatomic five membered rings as well as innumerable derivatives or reaction products thereof are useful in the manufacture or preparation of such varied products as the following—for convenience listed alphabetically:

| | |
|---|---|
| Acidic catalysts | Inks |
| Acidic reactants | Insecticides |
| Adhesives | Leather substitutes |
| Analytical reagents | Lacquers |
| Bactericides | Molding compositions |
| Cements | Paints |
| Chemical intermediaries | Pharmaceuticals |
| Curing agents | Photographic chemicals |
| Dyestuffs | Plasticizers |
| Electrical insulation | Plastics |
| Enamels | Poisons |
| Explosives | Plywood |
| Extenders for resins, plastics, rubbers, etc. | Rusting agents |
| | Resins |
| Fillers for resins, rubbers, etc. | Rubber vulcanization accelerators |
| Floor coverings | Solvents |
| Frictional elements | Stiffening agents |
| Fungicides | Synthetic rubbers |
| General reactants | Ultra reactive co-reagents |
| Glues | |
| Gums | Varnishes |
| Hardening agents | Vesicants |
| Impregnating materials | Vulcanizing agents |

The invention has been described in connection with a number of illustrative embodiments, materials, proportions, conditions and arrangements of operations for carrying out the invention. It is, therefore, to be understood that the invention is not to be restricted to the foregoing disclosure, and that no limitations are to be imported which are not required by the language of the appended claims and the state of the prior art. It is further to be understood that the invention is not dependent upon any explanations or theories which have been set forth as descriptive of the actions involved, nor dependent upon the accuracy or soundness of any theoretical statements so advanced.

We claim:

1. The method of producing the substantially fully saturated halogenation addition products of the aldehydes of the mono-heteroatomic five membered rings, which comprises the steps of diluting one or more of said aldehydes with a solvent in the proportion of at least one mole of the solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached.

2. The method of producing the substantially fully saturated halogenation addition products of the aldehydes of furan, which comprises the steps of diluting one or more of said aldehydes with a solvent in the proportion of at least one mole of the solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached.

3. The method of producing the substantially fully saturated halogenation addition products of the aldehydes of thiophen, which comprises the steps of diluting one or more of said aldehydes with a solvent in the proportion of at least one mole of the solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached.

4. The method of producing the substantially fully saturated halogenation addition products of the aldehydes of pyrolle, which comprises the steps of diluting one or more of said aldehydes with a solvent in the proportion of at least one mole of the solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached.

5. The method of producing the substantially fully saturated chlorination addition products of the aldehydes of the mono-heteroatomic five membered rings, which comprises the steps of diluting one or more of said aldehydes with a solvent in the proportion of at least one mole of the solvent to each mole of said aldehyde, and then rapidly introducing chlorine into the solution while maintaining the temperature thereof below the point of spontaneous decomposition until the aldehyde has taken up substantially four atoms of chlorine per molecule of aldehyde and the point of substantial saturation has been reached.

6. The method of producing the substantially fully saturated chlorination addition products of the aldehydes of furan, which comprises the steps of diluting one or more of said aldehydes with solvent in the proportion of at least one mole of the solvent to each mole of said aldehyde, and then rapidly introducing chlorine into the solution while maintaining the temperature thereof below the point of spontaneous decomposition until the aldehyde has taken up substantially four atoms of chlorine per molecule of aldehyde and the point of substantial saturation has been reached.

7. The method of producing the substantially fully saturated chlorination addition products of the aldehydes of thiophen, which comprises the steps of diluting one or more of said aldehydes with a solvent in the proportion of at least one mole of the solvent to each mole of said aldehyde, and then rapidly introducing chlorine into the solution while maintaining the temperature thereof below the point of spontaneous decomposition until the aldehyde has taken up substantially four atoms of chlorine per molecule of aldehyde and the point of substantial saturation has been reached.

8. The method of producing the substantially fully saturated chlorination addition products of the aldehydes of pyrolle, which comprises the steps of diluting one or more of said aldehydes with a solvent in the proportion of at least one mole of the solvent to each mole of said aldehyde, and then rapidly introducing chlorine into the solution while maintaining the temperature thereof below the point of spontaneous decomposition until the aldehyde has taken up substantially four atoms of chlorine per molecule of aldehyde and the point of substantial saturation has been reached.

9. The method of producing the substantially fully saturated chlorination addition product of furfural, which comprises the steps of diluting furfural with a solvent in the proportion of at least one mole of the solvent to each mole of furfural, and then rapidly introducing chlorine into the solution while maintaining the temperature thereof below the point of spontaneous decomposition until the furfural has taken up substantially four atoms of chlorine per molecule of furfural and the point of substantial saturation has been reached.

10. The method of producing the substantially fully saturated chlorination addition product of furfural, which comprises the steps of diluting furfural with carbon tetrachloride in the proportion of at least one mole of the carbon tetrachloride to each mole of furfural, and then rapidly introducing chlorine into the solution while maintaining the temperature thereof below the point of spontaneous decomposition until the furfural has taken up substantially four atoms of chlorine per molecule of furfural and the point of substantial saturation has been reached.

11. The composition of matter comprising a reactive, soluble and fusible, substantially fully saturated halogenation addition product of the aldehydes of the mono-heteroatomic five-membered rings, produced by the method which comprises the steps of diluting one or more of said aldehydes with a solvent in the proportions of at least one mole of the solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached.

12. The composition of matter of claim 11 in which the aldehyde is the aldehyde of furan.

13. The composition of matter of claim 11 in which the aldehyde is the aldehyde of thiophen.

14. The composition of matter of claim 11 in which the aldehyde is the aldehyde of pyrolle.

15. The composition of matter of claim 11 in which the halogen is chlorine.

16. The composition of matter of claim 11 in which the halogen is chlorine and the aldehyde is the aldehyde of furan.

17. The composition of matter of claim 11 in which the halogen is chlorine and the aldehyde is the aldehyde of thiophen.

18. The composition of matter of claim 11 in which the halogen is chlorine and the aldehyde is the aldehyde of pyrolle.

19. The composition of matter of claim 11 in which the halogen is chlorine and the aldehyde is furfural.

EMIL E. NOVOTNY.
GEORGE KARL VOGELSANG.

REFERENCES CITED

The following references are of record in the file of this patent:

UNITED STATES PATENTS

| Number | Name | Date |
|---|---|---|
| 1,682,934 | Richardson | Sept. 4, 1928 |
| 2,345,966 | Fiedler et al. | Apr. 4, 1944 |

FOREIGN PATENTS

| Number | Country | Date |
|---|---|---|
| 38,423 | Germany | Jan. 18, 1887 |
| 290,531 | Germany | Mar. 4, 1916 |

OTHER REFERENCES

Groggins; Unit Processes in Organic Synthesis. McGraw-Hill, 1938, pages 171 and 175.

C. A. 1935, p. 4354, citing: J. A. C. S., vol. 57(1935), pp. 906–912.

Berichte, vol. 32, pp. 2084–7.

C. A. 1941, pp. 2507–8, citing J. Organic Chem., vol. 6 (1941), pp. 157–168.

C. A. 1930, p. 1859, citing J. A. C. S., vol. 52, pp. 1170–2.

C. A. 1931, p. 4880.

C. A. 1933, p. 2442, citing: J. Prakt. Chem., vol. 136, pp. 232–240.

C. A. 1933, p. 5073.